United States Patent [19]

Weman et al.

[11] 4,389,561
[45] Jun. 21, 1983

[54] SELF-POSITIONING WELDING OR CUTTING TORCH

[75] Inventors: Klas B. Weman; Hans E. A. Grohn, both of Laxa, Sweden

[73] Assignee: Esab Aktiebolag, Sweden

[21] Appl. No.: 277,989

[22] Filed: Jun. 26, 1981

[30] Foreign Application Priority Data

Jul. 3, 1980 [SE] Sweden ................................ 8004926

[51] Int. Cl.³ .............................................. B23K 9/12
[52] U.S. Cl. .................................... 219/124.34; 228/9
[58] Field of Search ...................... 219/124.22, 124.34; 318/575, 576, 578, 672, 673; 228/8, 9

[56] References Cited

U.S. PATENT DOCUMENTS 3,997,757 12/1976 Cecil et al. ...................... 219/124.34
4,159,429 6/1979 Migliardi et al. .................... 318/578
4,333,052 6/1982 Schmall ......................... 219/124.34

Primary Examiner—C. C. Shaw
Attorney, Agent, or Firm—Lerner, David, Littenberg, Krumholz & Mentlik

[57] ABSTRACT

A sensor for detecting the relative position of a workpiece with respect to the tip of a welding or cutting torch, which is movable in optional directions by positioning devices, is provided with a sensing body in annular form which surrounds the tip and is adapted to make contact with the workpiece on any side of the central opening of the sensing body. An arm is attached to the sensing body and is displaced in a direction and to a degree corresponding to the displacement of the sensing body. The displacement of the arm is detected and a signal corresponding to that displacement is generated to reposition the welding head in response to the signal.

3 Claims, 4 Drawing Figures

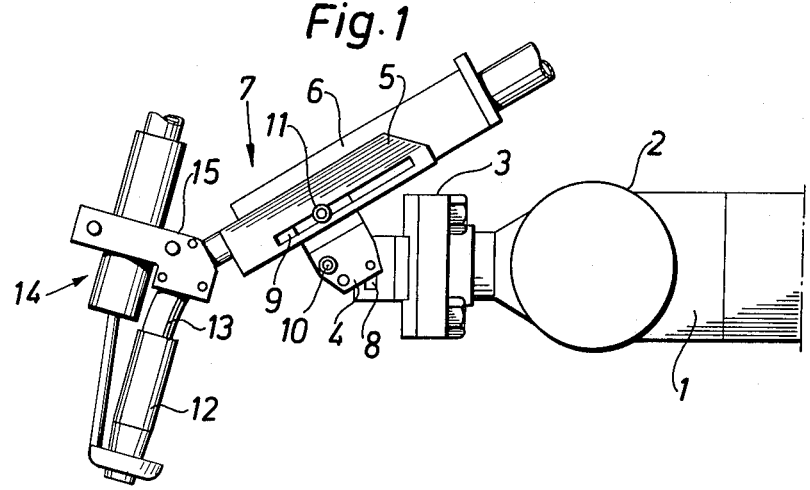
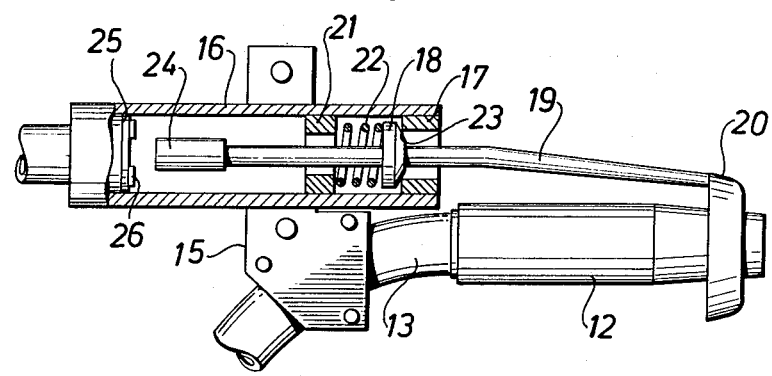
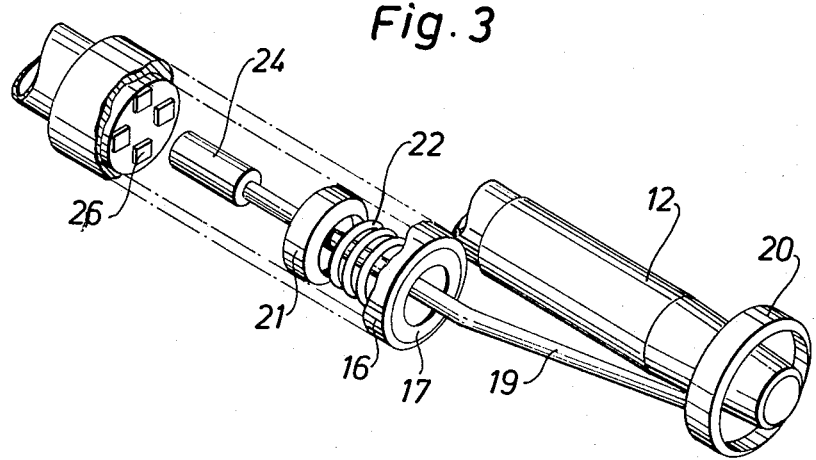

SELF-POSITIONING WELDING OR CUTTING TORCH

BACKGROUND OF THE INVENTION

This invention relates to sensors which are used to detect and determine the relative position of a workpiece with respect to the tip of a torch, such as a welding or cutting torch, of the type which is movable in various and optional directions by positioning devices.

Sensors of this general type are provided with an arm which, at one end, carries a sensing body which is intended and adapted to make contact with the workpiece. Generally speaking, a housing is affixed to the end of the torch so that the arm can be swiveled in at least two different planes. The arm is provided with devices which are adapted to cooperate with devices fitted within the housing to generate control signals. These control signals affect the positioning devices in a manner which corresponds to the swiveling displacement of the arm relative to a pre-determined neutral position of the arm.

Sensors of this general type are described in U.S. Pat. No. 3,171,012 of Feb. 23, 1965 in the name of Laural A. Morehead and U.S. Pat. No. 3,997,757 of Dec. 14, 1976 in the name of Shelby Cecil and Dean D. Riggs. Sensors of the type described in these patents are provided with a sensing body which consists of a feeler which picks up the direction of a welding joint. These sensors generate signals which correspond to the position of the welding tip relative to the welding joint. The signals guide the devices which position the tip so that the tip assumes a defined, desired position such as, for example, being always directed toward the center of the joint.

Sensors of this general type can also be used in conjunction with "robots", i.e., devices for the fully automatic handling of tools and workpieces in accordance with a given program. Such robots are presently used extensively in the welding field. Through the use of such a robot, the welding torch is guided from an initial position to the starting point of the welding joint and from there along the welding joint according to a pre-determined program. The sensor detects the actual direction of the welding joint which, as a result of tolerances, generally deviates somewhat from the direction prescribed in the program. The robot is programmed to adapt to the actual conditions.

Such robots are also used extensively in the mass production of workpieces which, in some instances, are conveyed to and placed upon the workplace by another robot. Thus, the workpiece does not always occupy the same position on the workplace and may also be subject to manufacturing and installation tolerances. As a result, the position of the welding joint may be different for each workpiece. Before commencing the welding work, the robot must perform a special localization movement to locate the starting point of the welding joint. To exactly position the workpiece it is generally necessary and required that localization be performed in three directions or planes. To perform this localization, the tip with the sensor is taken to the vicinity of the workpiece and the feeler of the sensor is caused to successively make contact with three selected surfaces of the workpiece in the vicinity of the starting point of the welding joint. Upon making contact with the surfaces, the sensor generates signals which are processed in the robot's computer to determine the position of the starting point. This procedure presupposes that the position of the starting point can be defined with the help of these surfaces; by and large, this is always possible with adequate accuracy.

A feeler which is fitted asymmetrically with respect to the tip, such as the prior art devices shown in the patents referred to above, must be capable of rotating around the axis of the tip so that it can be made effective in the aforesaid three directions of localization. Since one of the degrees of freedom of the robot must be set aside for rotary motion of the tip and therefore cannot be utilized in this operation, the field of application for such robots is limited. In other words, sensors of the type shown in the aforementioned patents have inherent limitations, in that the sensor can only be located on one side of the welding head at any given instant. Thus, such prior art devices are incapable of detecting the proximity of objects which, at any given moment, are located on a side of the welding tip other than the side on which the sensor is presently located.

SUMMARY OF THE INVENTION

It is therefore, an object of the present invention to provide a new and improved sensor for use in ascertaining the relative position of a workpiece with respect to the tip of a welding torch or similar device.

It is a further object of the present invention to provide such an improved sensor which can detect the presence of an object on any side of the welding tip without a prior adjustment.

In accordance with an illustrative embodiment demonstrating these and other objects and features of the present invention, a sensor for establishing the relative positions of a workpiece and the tip of a torch which is adapted to perform a work function upon the workpiece includes a sensing body. The sensing body surrounds the tip of the torch and is displaceable relative to the tip upon contracting a surface of the workpiece at any point about the periphery of the tip. A connecting means is mounted to the sensing body to be displaced therewith in a direction and to a degree corresponding to the displacement of the sensing member. Means are provided for detecting the displacement of the connecting means and generating a signal corresponding therewith for positioning the torch in response to the aforesaid signal.

The foregoing brief description as well as further objects, features and advantages of the present invention, will be understood more completely from the following detailed description of a presently preferred but nonetheless illustrative embodiment, in accordance with the present invention, when taken in conjunction with the accompanying drawing.

BRIEF DESCRIPTION OF THE DRAWING

FIG. 1 is an elevational view showing the front portion of a robot arm, together with a welding torch to which is mounted a sensor embodying the present invention;

FIG. 2 is a partial section view of a sensor of the present invention which is mounted to a welding torch;

FIG. 3 is a schematic isometric view of the sensor which is partially cut away to illustrate the internal construction thereof.

DETAILED DESCRIPTION OF THE PREFERRED EMBODIMENTS

Figure 4:
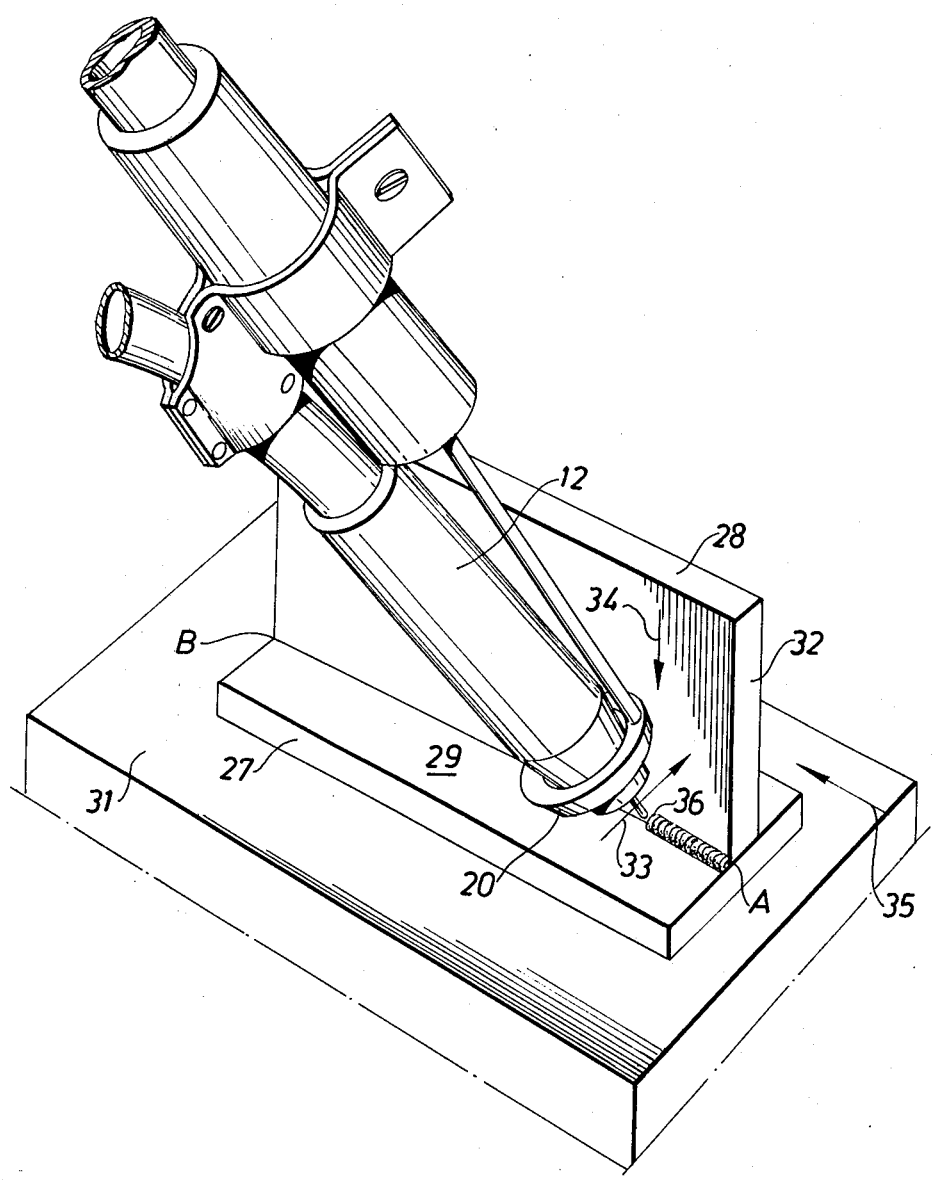
FIG. 4 is an isometric view showing a welder with the sensor mounted thereto in operation on a workpiece.

Referring now to the drawing, wherein like reference numerals refer to similar parts throughout the various figures thereof, a robot arm 1, as shown in FIG. 1, comprises two sections 2, 3, having axes which are at right angles to each other. The design and mode of operation of such robots is described in extensive literature and is not considered part of the present invention.

The end of the robot arm 1 is provided with a holder 4 and a clamping member 5 to which is clamped a handle 6 of a welding torch, generally designated as 7. The holder 4 and the clamping member 5 are provided with slots 8, 9 and locking screws 10, 11 for fixing the welding torch in a suitable position which is chosen with a view toward the operating movement of the robot. The tip 12 of the welding torch or welding head is connected by means of a curved electrode lead tube 13 to the handle 6.

A sensor 14 is attached to the electrode lead tube 13 by means of a clamp 15. As best illustrated in FIG. 2, the sensor 14 includes a housing 16 having a front supporting ring 17. The supporting ring 17 abuts and supports a conical washer 18 which, in turn, is fixed to an arm 19. The arm 19 acts as a connecting member and is affixed to and carries on its front end a ring 20. The ring 20 acts as a sensing body and is constructed and arranged to surround the welding tip 12 in its central opening. The ring 20 is adapted to make contact with objects on any side of its central opening and to be displaced by such objects. The ring 20 is annular and is preferably substantially circular.

The conical washer 18 is biased and pressed against the supporting ring 17 by a spring 22, which is mounted between the washer 18 and rear supporting ring 21. The arm 19 can be swiveled in at least two different planes and preferably in all directions around the inside edge 23 of the supporting ring 17. However, it will be appreciated that, in the absence of an external force causing the arm 19 to be swiveled, the washer 18 remains seated symmetrically against the supporting ring 17. Hence, the ring 20 remains positioned in a central or starting position which is substantially coaxial with the welding tip 12. In such starting position, the portion of arm 19 within the housing 16 is substantially parallel to and coextensive with the central axis of the housing 16. It will be readily appreciated that the displacement of the arm 19 is in a direction and is to a degree which corresponds to the displacement of the sensing body or ring 20 from its central or starting position.

As shown is FIG. 3, at the rear end of the arm 19 there is mounted a permanent magnet 24, which cooperates with four magnetodynamic resistances 26 mounted symmetrically on a plate 25 in the form of a ring. When the sensor ring 20 is not influenced by any outside forces and is in its central or starting position, the permanent magnet 24 points toward the center of the four resistances 26. In this position, the sensor is in its neutral position and the magnetodynamic resistances 26 are influenced equally by the permanent magnet 24. The magnetodynamic resistances 26, in conjunction with the permanent magnet 24, act as a means for detecting the angular displacement of the arm 19 relative to its starting position and generating a signal which corresponds to that displacement.

The resistances 26 are connected in a conventional manner to control circuits, which respond to the signal generated by the position of the permanent magnet 24 and act upon the positioning mechanisms of the robot to adjust the position of the welding tip or head 12. Circuits similar to those used with the present invention have been described in the two patents referred to above, and the control circuitry and its connections do not form any part of the present invention.

It will be appreciated by those skilled in the art that, in place of the permanent magnet 24 and the magnetodynamic resistances 26, other devices such as a light-emitting diode and phototransistors may be also be used.

The use of the sensor 14 of the present invention as a joint follower is illustrated in FIG. 4. A generally horizontal workpiece 27 and a generally vertical workpiece 28 form a fillet joint defined generally by the line A-B. The sensor ring 20 is in contact during the welding with joint surface 29 of the workpiece 27 and joint surface 30 of workpiece 28. If the robot is programmed for a straight welding joint between points A and B, the sensor 14 is influenced or activated only if the joint to be welded deviates from the direction which has been programmed.

The two workpieces 27, 28 are set up on a working table 31 or the like. In the mass production of many uniform workpieces, it will be appreciated that the starting point for welding must be localized anew each time, since the workpieces inevitably will be not be placed in exactly the same positions. To localize the starting point, the welding torch guided by the robot is taken successively toward the surfaces 29, 30 and an end surface 32 of one of the workpieces 27 or 28. An example of possible directions of localization for the workpiece 27, 28 is illustrated in FIG. 4 by the three arrows 33, 34 and 35 which are directed, respectively, toward the surfaces 29, 30 and 32. As shown as the sensor ring 20 makes contact with one of the surfaces, the robot continues to localize in an appropriate direction until it make contact with the second surface and, finally, with the third surface. From the starting point A located in this manner, the welding torch follows the welding joint to point B according to the program stored in the robot. Alternatively, if the sensor 14 is used as a joint follower, the torch proceeds to point B according to the signals transmitted in a known manner by the sensor 14 to the robot, which signals correspond to the relative position of the torch with respect to the welding joint.

As a consequence of the design of the sensor ring 20, the making of contact between the ring 20 and the workpiece 27, 28, and the indication of such contact by the sensor 14, take place irrespective of the relative position of the welding torch with respect to the workpiece. All three directions are scanned, without the necessity of the welding torch 7 and the sensor 14 having to be rearranged or reoriented to obtain the desried indication.

It will be appreciated that, in following a welding joint, the sensor ring 20 does not detect the true position of the welding point 36, but only detects the position indirectly by making contact with the workpiece at a point which is in the vicinity of the joint, albeit not exactly at the joint. For this reason, it is advantageous to place the sensor ring 20 as near as possible to the front end of the welding tip 12. This will have the effect of limiting any error which may arise through the indirect determination of position just described, which is often called parallax error. When the ring 20 is positioned as close or as proximate to the welding tip as possible, such error is very small and is of no significance with respect to the quality of the weld.

As will be readily apparent to those skilled in the art, the invention may be used in other specific forms of sensors without departing from its spirit or essential characteristics. The present embodiments are, therefore, to be considered as illustrative and not restrictive, the scope of the invention being indicated by the claims rather than the foregoing description, and all changes which come within the meaning and range of equivalents of the claims are therefore intended to be embraced therein.

What is claimed is:

1. A torch comprising a torch body having a longitudinal axis and a tip; a sensor mounted to said torch body for establishing the relative positions of said tip of said torch body and an object radially disposed relative to said longitudinal axis, said sensor comprising:
   (a) an annular sensing body surrounding said tip of said torch body so that said torch body extends through said sensing body, said sensing body being radially displaceable relative to said tip upon contacting an object radially disposed relative to said tip of said torch at any point about the periphery of said tip;
   (b) connecting means mounted to said sensing body to be angularly displaced with respect to said longitudinal axis in a direction and to an extent directly corresponding to the displacement of said sensing body;
   (c) means for continuously detecting the angular displacement of said connecting means and generating a signal directly corresponding to said angular displacement; and
   means for receiving said signal and continuously positioning said torch body in a direction and to an extent directly corresponding to said signal.

2. A sensor according to claim 1 further comprising biasing means for positioning said sensing body in a central position substantially coaxial with the torch when said sensing body is not in contact with the workpiece.

3. A sensor according to claim 1 and claim 2 wherein said sensing body is a substantially circular ring.

* * * * *